US005321242A

United States Patent [19]

Heath, Jr.

[11] Patent Number: 5,321,242

[45] Date of Patent: Jun. 14, 1994

[54] APPARATUS AND METHOD FOR CONTROLLED ACCESS TO A SECURED LOCATION

[75] Inventor: William D. Heath, Jr., Bremen, Ga.

[73] Assignee: Brinks, Incorporated, Darien, Conn.

[21] Appl. No.: 811,720

[22] Filed: Dec. 20, 1991

Related U.S. Application Data

[63] Continuation-in-part of Ser. No. 804,780, Dec. 9, 1991, abandoned.

[51] Int. Cl.[5] .................... G06K 5/00

[52] U.S. Cl. .................... 235/382; 235/379; 235/382.5; 235/381; 379/102; 902/10; 340/825.31

[58] Field of Search .................... 379/145, 102, 103, 104, 379/105, 445; 235/379, 381, 382, 382.5; 902/10, 9, 13; 340/825.31, 825.34, 825.35

[56] References Cited

U.S. PATENT DOCUMENTS

| | | | |
|---|---|---|---|
| 4,207,555 | 6/1980 | Trombly | 235/382.5 |
| 4,234,932 | 11/1980 | Gorgens | 235/379 |
| 4,390,968 | 6/1983 | Hennessy et al. | 235/379 |
| 4,523,087 | 6/1985 | Benton | 235/379 |
| 4,663,952 | 5/1987 | Gelhard | 70/278 |
| 4,829,296 | 5/1989 | Clark et al. | 235/382 |
| 4,858,453 | 8/1989 | Namazue | 70/278 |
| 4,962,449 | 10/1990 | Schlesinger | 235/382 |
| 5,056,643 | 10/1991 | Kirberg | 235/379 |
| 5,131,038 | 7/1992 | Puhl et al. | 235/382 |

FOREIGN PATENT DOCUMENTS

| | | | |
|---|---|---|---|
| 0164733 | 12/1985 | European Pat. Off. | 235/379 |
| 0097469 | 5/1985 | Japan | 235/379 |
| 2225918 | 6/1990 | United Kingdom | 379/102 |
| 2237912 | 5/1991 | United Kingdom | 379/145 |

OTHER PUBLICATIONS

"Enter the Electronic Security Age", Medeco High Security Locks, pp. 1-21.

"Guard Buddy" Project, Honeywell Protection Services.

*Primary Examiner*—Donald Hajec
*Assistant Examiner*—Esther Chin
*Attorney, Agent, or Firm*—Jones & Askew

[57] ABSTRACT

A system for authorizing access to a secured device, such as an automated teller machine (ATM) or a pay telephone, without a key or combination for the secured device, and without a fixed communication link extending to the device. An encoded access message is produced which identifies a present access code previously stored at the secured device, the personal identification number (PIN) of a technician, and the identification number of a particular portable terminal. The technician manually enters the encoded access message and a PIN into the terminal, which verifies the identification number of the terminal and the manually-entered PIN against information encoded in the access message. If that information is authenticated, the portable terminal is connected to the secured device. The encoded access message is transferred from the terminal to the secured device, which compares an access code previously stored at that device with information contained in the access message. The proper PIN also is re-entered. Access is granted only if all information is verified by information in the encoded access message. If access is allowed, the access code at the secured device is replaced by a new access code from the encoded access message, and that new access code is stored for the next authorized access to the particular secured device.

24 Claims, 10 Drawing Sheets

APPARATUS AND METHOD FOR CONTROLLED ACCESS TO A SECURED LOCATION

CROSS-REFERENCE TO RELATED APPLICATION

This is a continuation-in-part of Ser. No. 07/804,780 filed Dec. 9, 1991 and now abandoned.

FIELD OF INVENTION

This invention relates in general to controlling access to a secured or locked location, and relates in particular to an apparatus and method for providing controlled access by an identification number known only to an authorized person and by an access code known only at the secured location.

BACKGROUND OF THE INVENTION

There are many applications where amounts of money are kept in unmanned facilities that are open to public access. For example, cash-operated devices such as vending machines and pay telephones are available to the public and accrue varying amounts of cash as they dispense goods or services to customers. These machines periodically are serviced to remove the money and, in the case of vending machines, to replenish the supply of products. Persons authorized to service pay telephones or vending machines must carry keys permitting access to the coin box or other receptacle receiving money paid into the machine. Pay telephone coin boxes are serviced by a collector who periodically visits each pay phone. The collector unlocks an outer door to the phone using a key for that purpose, and then removes the coin box from within the phone and substitutes an empty coin box. If the collector is allowed to carry one or more master keys for servicing a number of telephones, the risk of loss by theft or misappropriation of a single key is apparent. On the other hand, requiring the collector to carry a separate key for each pay phone represents a significant inconvenience, particularly in areas such as airport terminals where large numbers of pay phones are located. Furthermore, the risk of loss through theft or misuse of individual keys still exists.

Automated teller machines (ATMs) are another example of machines containing cash and requiring periodic access for replenishing the cash supply or maintaining and repairing the machines. Because ATMs are capable of containing large amounts of money relative to most vending machines, they are more inviting targets for theft. For this reason, the cash within an ATM is contained within a small vault integral with the ATM and typically accessible only through a vault door having a combination lock, sometimes combined with a key access, for opening the vault door. Portions of the electronic controls for the ATM also may be located within the vault to prevent unauthorized cash dispensing by tampering with control circuits. Generally speaking, the cash within a locked ATM is secure from any unauthorized activity short of safecracking.

The need for periodic access to the vault of an ATM machine to replenish the cash supply, or to service equipment within the vault, constitutes a weak link in ATM security. If vault access is available only to technicians possessing the proper key or numerical combination to open the vault door, those technicians are vulnerable to being hijacked and forced to hand over the key or divulge the combination to open the vault. Furthermore, job turnover of ATM technicians makes it impractical to give each technician the combinations of ATM vaults, because of the need to reset those combinations whenever the technician left the job. For the same reason, key-only access to ATM vaults presents a problem when the technician leaves the job, due to the risk that the technician may not return the keys or may make an unauthorized copy of the keys while employed. Further yet, security considerations rule against allowing any technician to carry master keys capable of unlocking the vaults in a number of different ATMs, due to the risk of great loss if such master keys were stolen or otherwise came into the wrong hands.

Prior-art techniques are known for providing keyless access to ATMs or other machines containing significant amounts of cash. These techniques generally require an electronic link between the machine and a central office, and an arrangement for unlocking the vault whenever the proper signal arrives from the central office. To avoid the cost of providing dedicated lines between the central office and a great number of ATMs, these prior-art techniques usually rely on the public telephone network and a modem associated with each ATM, in order to communicate between the central office and a selected ATM. While these techniques relieve the service technician of the need to carry either access keys or combinations for the ATM vaults, it still leaves the technician subject to being hijacked by robbers who will then coerce the technician to request access from the central office. On a more sophisticated level, the use of conventional telephone lines for transmitting access signals to ATMs makes those signals subject to interception by wiretapping, leading to the fear that the access signals may be analyzed and then used by others for unauthorized access to ATM vaults. Moreover, the dial-up telephone line required for each ATM is an ongoing expense to the bank or other agency sponsoring the ATM.

SUMMARY OF INVENTION

Stated in general terms, a call for service or repair of an ATM or another secured device is reported to a service technician, along with a unique encoded access message generated for the particular occasion. The technician can receive this access message by telephone or radio dispatch, because the information contained therein is encrypted so as to conceal the information. This access message contains the personal identification number (PIN) identifying that particular technician, the serial number or other unique identifier of the particular portable terminal, present and future access codes for the secured device, and other information appropriate for a particular application, all as encrypted in the encoded access message. The technician carries a portable terminal and enters the access message into that terminal along with a PIN, and the portable terminal verifies access message was entered in the correct terminal and that the proper PIN was used. The technician then travels to the location of the ATM or other device requiring service. At that location, the technician connects the portable terminal to the secured device and once again enters the PIN into the terminal, where that number again is verified against the access code previously contained in the encoded access message. This double verification of the technician's PIN thwarts unauthorized access in a situation where the technician is hijacked after receiving a service call from the dispatcher and then entering the proper PIN into the portable terminal for self-authentication. With the portable terminal connected to the secured device, the encoded message is sent to the device where a computer checks for the presence of correct information identifying the device and authenticating the access being requested, and allows access to the vault only if that correct information is present.

Because the PIN assigned to the particular technician is among the information contained in the encoded access message initially furnished to the technician, the present system accommodates the departure of a technician simply by retiring that person's PIN number from further use and assigning new numbers for new technicians. Any unauthorized interception of an access message thereafter by a former technician will fail, even if intercepted by someone possessing a portable terminal obtained by theft or fraud, because the serial number of that terminal will not match the corresponding number in the encoded access message and because that person does not know the new PIN for use by someone else and encoded into the access message.

Stated somewhat more particularly, the encoded access message transmitted to the technician according to the present invention includes a present access code for gaining access to the secured location at the present time, in addition to the PIN for the technician authorized for that access. This present access code must correspond to an access code previously stored at the secured location, or else the system will deny the present attempt to gain access to the secured location. The encoded access message also contains a new access code intended for future use by that particular secured location. If the PIN entered by the technician matches the PIN encoded in the access message and if the present access code within that message matches the access code previously stored at the secured location, then access is granted and that present access code is erased and replaced by the new access code contained in the encoded message. This new access code remains stored at the secured location and becomes the authorized access code for use the next time access to that location is sought. In this manner, each access code is used only one time and anyone attempting to create an encoded access message for a particular location must have present knowledge not only of that location, the authorized PIN for a particular technician, and the serial number of the particular portable terminal authorized for that technician, but must also know the access code previously stored at that secured location. Without this specific information, and other information as may be appropriate and as described further herein, an attempt to counterfeit an encoded access message will fail. Each present access code preferably is unique to a particular secured location and may be based on a randomly-generated number, so that the likelihood of duplicating that number by chance becomes so low as to be negligible in practice. The ATM can maintain a historical file of all attempts to access the vault, whether granted or disallowed. If a loss occurs, one can consult the historical file for preloss activity. This information may also predict problems arising from repeated attempts to access the vault.

Accordingly, it is an object of the present invention to provide an improved apparatus and method for controlling access to a secured location.

It is another object of the present invention to provide an improved apparatus and method for controlled access to automated teller machines.

It is a further object of the present invention to provide the capability of selective access to a secured location without requiring a telephone line or other data link between that location and a central office.

It is still another object of the present invention to provide an apparatus and method for authorized access to a locked location without requiring either a key or the combination for a lock, or by requiring a level of security in addition thereto.

It is yet another object of the present invention to provide an improved apparatus and method for selective access to the coin box of a pay telephone or the like.

Other objects and advantages of the present invention will become more readily apparent from the following disclosure of a preferred embodiment.

DETAILED DESCRIPTION OF PREFERRED EMBODIMENT

Figure 1:
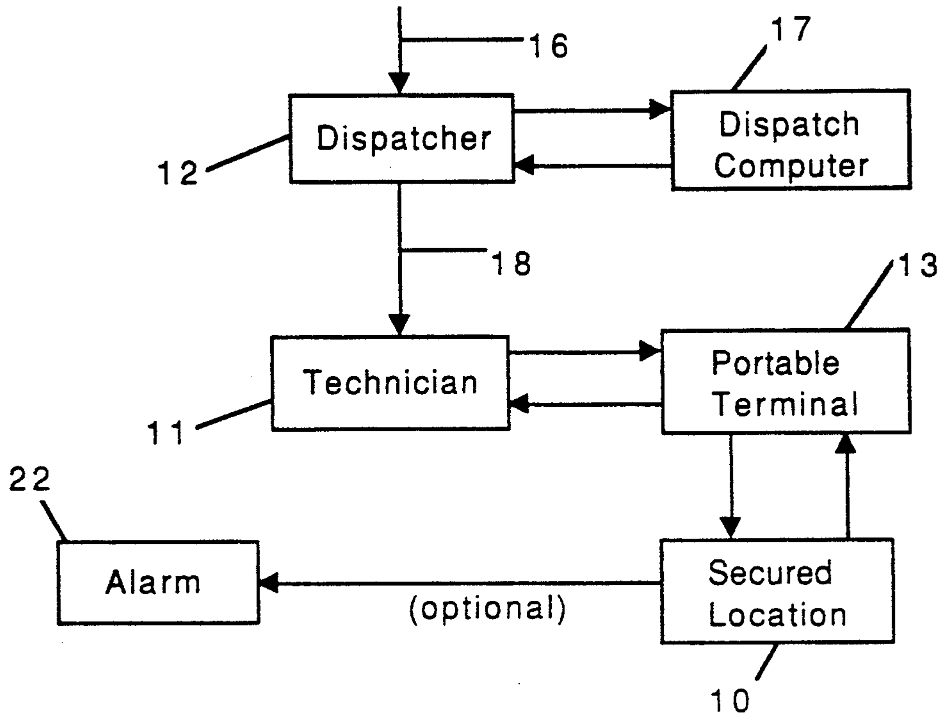
FIG. 1 is a schematic view illustrating the flow of information required for gaining access to a secured location according to a first preferred embodiment of the present invention.

FIG. 1 shows a functional outline of a secured access system according to a preferred embodiment of the present invention. This secured access system includes at least one secured location 10, such as an ATM or other apparatus having a vault or other secured enclosure normally kept locked and inaccessible persons. In actual practice, systems utilizing the present invention are associated with a number of separate secured locations, such as the ATMs belonging to a particular bank or located in a particular area. A number of these secured locations 10 are serviced by one or more technicians 11 in response to instructions received from a dispatcher 12 at a central location. Each technician 11 carries a portable computer terminal 13 which may be a conventional hand-held terminal programmed to function as pointed out below in greater detail.

The dispatcher 12 receives information as indicated by the line 16, concerning problems with a secured location 10. These reports may be relayed from the bank or other institution that operates or sponsors the secured locations, or alternatively may come directly from the secured locations themselves by way of telephone links reporting a problem at the secured location. Upon receiving a problem report concerning a particular secured location 10, the dispatcher 12 obtains from the dispatch computer 17 an encoded access message that a selected technician 11 must use to gain access to that particular secured location. This access message contains various information as pointed out below in greater detail, including information identifying the present access code previously stored at that location, the PIN of the particular technician 11 selected by the dispatcher to visit the secured location, and the serial number of the portable terminal 13 assigned to that particular technician. It should be understood that the foregoing information preferably is contained in a database maintained at the dispatch computer 17. The dispatch computer 17, at the request of the dispatcher 12, generates a number containing the foregoing access information in encoded form. This number thus becomes an encoded access message which the dispatcher 12 can send to the technician 11 over an open link 18, such as a telephone line or radio dispatch communication, without concern that unauthorized interception of the encoded access message will yield any useful information to anyone lacking the proper terminal 13 and the PIN of the technician.

The technician 11, upon learning from the dispatcher 12 that a particular secured location 10 requires attention and receiving the encoded access message for that particular job, manually enters that access message into the portable terminal 13. The technician also enters his or her assigned PIN into the portable terminal 13. The portable terminal compares its own serial number or other internal identification number with the known serial number of the terminal assigned to the particular technician 11, as based on information within the database of the dispatch computer 17, to confirm that the access information was entered into the proper portable terminal. The manually-entered PIN also is compared with the PIN encoded in the manually-entered access message to make certain those PINs match; the portable terminal preferably is programmed to erase the entire encoded access message at this time, if the PIN manually entered by the technician does not match the PIN information contained within the encoded access message received from the dispatcher 18. This erasure of the access message aborts the access procedure without recourse, so that a hijacked terminal 13 cannot thereafter be disassembled and the internal memory electronically read by a technically-sophisticated thief in an effort to retrieve the encoded access message from the portable terminal.

After the portable terminal 13 verifies it is the proper terminal indicated in the encoded access message and that the proper PIN was entered, the technician then travels with the terminal 13 to the secured location 10. At that location, the technician connects the portable terminal 13 to the ATM or other apparatus at the second location, whereupon the portable terminal transfers to the secured location the encoded access message that the technician previously received from the dispatcher and entered into the portable terminal. At this time the technician must again enter his PIN into the portable terminal, where that number again must match the PIN encoded in the access message. The computer within the secured location also compares the serial number of the portable terminal 13 with the terminal serial number within the encoded message, to confirm that the terminal connected to the secured location is in fact the terminal assigned to the particular technician based on information within the encoded access message.

As a further check on the integrity of the encoded access message and the authenticity of the access being sought, a "present access code" previously stored at the location 10 is compared with a present access code within the encoded access message and obtained from the database of the dispatch computer 17. If those present access codes match, the vault door or other access port at the secured location is released, allowing access by the technician 11 for service or maintenance. The secured location at this time may return information to the still-connected portable terminal 13 indicating that access was granted, together with the date and time this access began and ended. The technician 11 can later upload that access-related information from the portable terminal 13 to the dispatch computer 17, thereby providing the dispatcher 12 with an historical record of telling when and by whom various secured locations 10 were accessed.

If the incorrect PIN is entered into the portable terminal 13 when connected to the secured location 10, an alarm signal is optionally provided along the line 21 to an alarm 22. This alarm 22 preferably is an off-site alarm located remotely from the secured location 10, with the alarm transmitted along a telephone line or radio link represented by the line 21 to alert the police or other authorities about a possible unauthorized attempt to gain entry, to protect the safety of a hijacked technician forcibly detained at the secured location 10.

Figure 2:
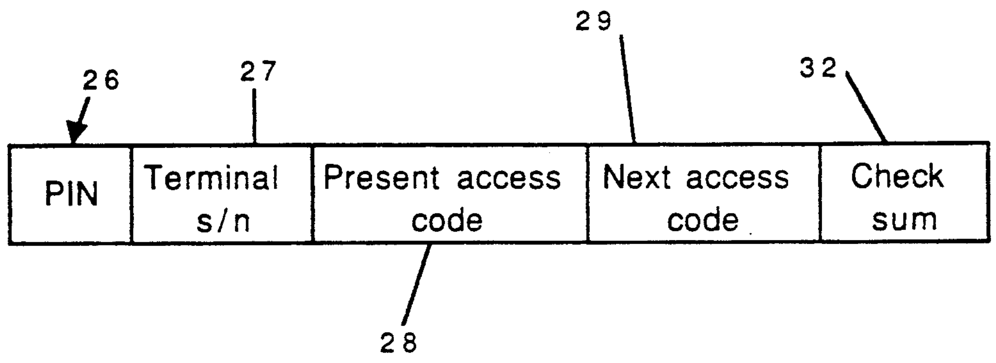
FIG. 2 represents the information contained in an encoded access message according to the first embodiment.

The information contained in the encoded access message used with the preferred embodiment of the present invention is shown in FIG. 2. That information includes the PIN 26 identifying the particular technician 11 dispatched for a service call to an ATM, and the serial number 27 of the portable terminal 13 assigned to that technician. The encoded access message also contains the present access code 28 corresponding to an access code previously stored at the ATM in question, and the "next access code" 29 that replaces the present access code at the ATM upon successful authorization of the present access. Although not included in the particular access message of the preferred embodiment, the access message can include other information relevant to security, such as an ATM code identifying the particular ATM to which the technician 11 has been dispatched, and the date and time of this particular service request. A check sum digit 32 may also be incorporated into the information contained in the encoded access message, as is known to those skilled in the art. The information contained in the access message as illustrated in FIG. 2 is encoded by appropriate known public encryption algorithms such as the Data Encryption Standard (DES), which is widely documented and has been accepted by the banking industry for electronic information exchange. Encryption and decryption of information as used herein thus is within the skill of the art. The actual encoded access message delivered by the dispatcher 12 to the technician 11 thus consists, for example, of a 12-digit string having no humanly-perceptable relation to the information depicted in FIG. 2. That 12-digit string is subsequently decoded by software within the portable terminal 13 and within the secured location 10 after the encoded access message is transferred to that location.

Figure 3:
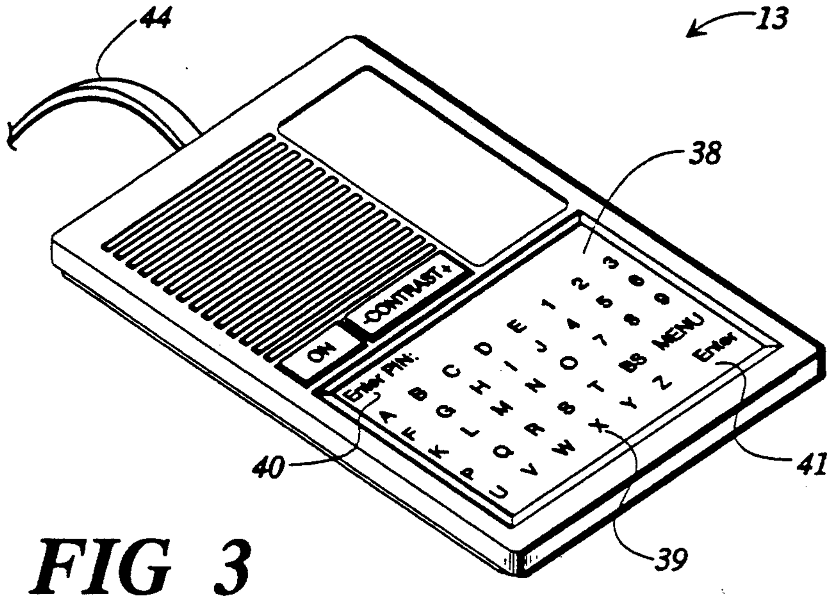
FIGS. 3 and 3A are pictorial views illustrating a portable terminal used in the first embodiment.
Figure 3A:
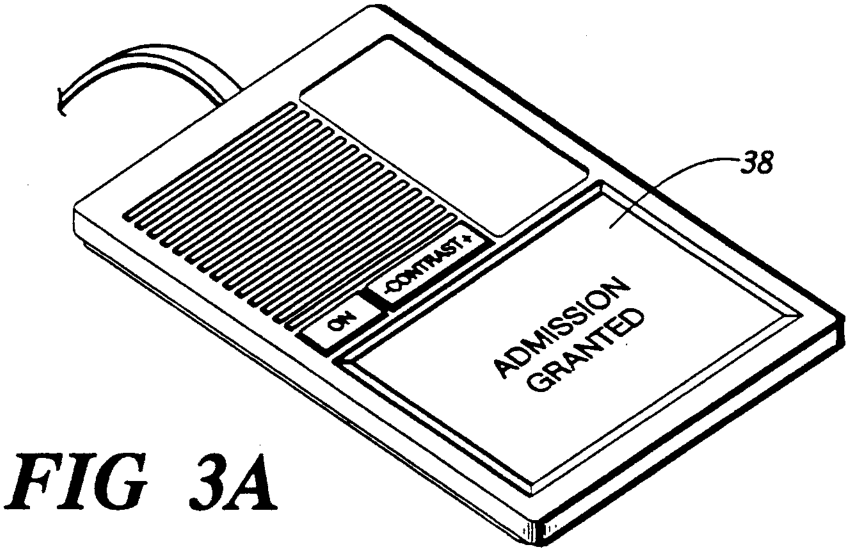
Figure 4:
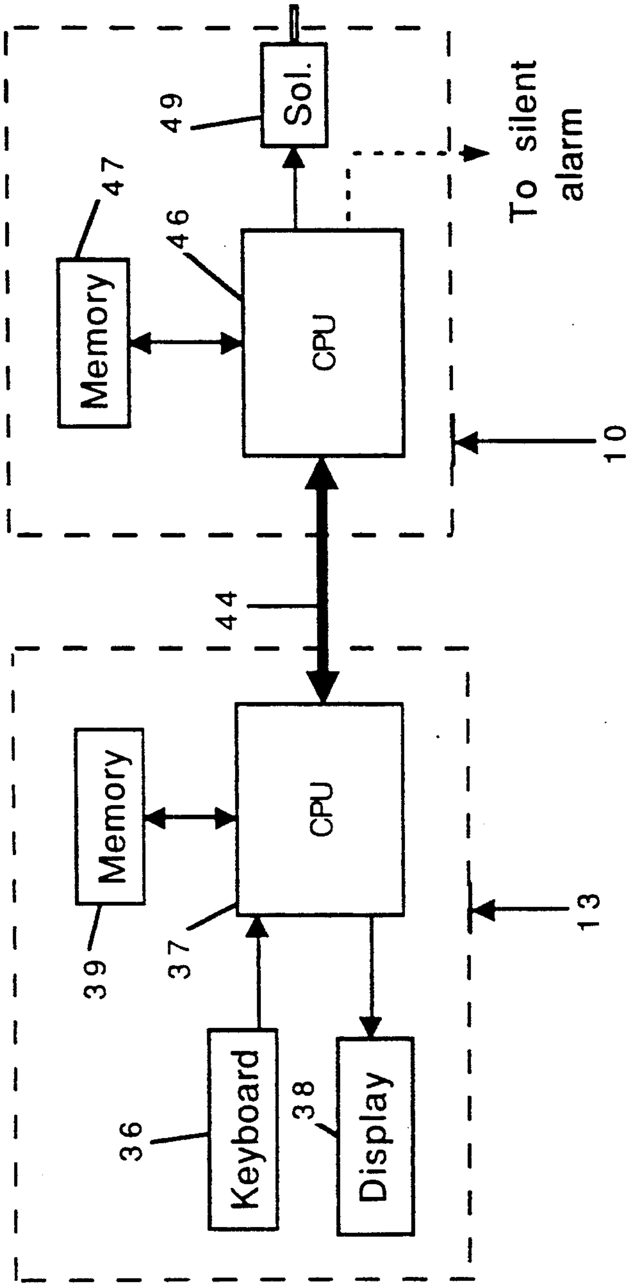
FIG. 4 is a block diagram illustrating components of the portable terminal and interfacing components of an ATM, in the first embodiment.

A portable terminal 13 used in the preferred embodiment of the present invention is shown in FIG. 3, and the major operational components of that terminal are depicted in FIG. 4. The portable terminal 13 includes a keyboard 36 connected to a central processing unit (CPU) 37, which in turn drives a display 38. A memory 39 is connected to the CPU and contains stored programming to perform the operational steps as described below. As seen in FIGS. 3 and 3A, the display 38 comprises a flat LCD panel which in that figure displays an alphanumeric keypad and also displays the command "Enter PIN:" 40 at the upper-left corner of the panel. The electrical contacts of the keyboard 36 are situated beneath the flat panel display 38, which is sufficiently flexible or otherwise responsive to the finger pressure of a person entering an alpha/numeric PIN and then pressing the "Enter" key 41 appearing at the lower-right corner of the display 38 in FIG. 3.

Portable terminals suitable for use with the present invention are obtainable from various sources. The programming of such terminals is well known to those of ordinary skill of the art and need not be further described herein. The programming code to perform the steps described herein preferably is stored in battery-powered RAM within the terminal, so that the programming is electronically erasable in the event of tampering with the terminal. The alpha/numeric keyboard and menu display 39 generated on the display 38 of the portable terminal 13, as shown in FIG. 3, is selectively replaceable by a programmed message display, such as the message "ADMISSION GRANTED" shown on the display 38 in FIG. 3A.

A cable 44 extends from the portable terminal 13 for connecting that terminal to an RS-232 port at the ATM or other secured location 10, as depicted in FIG. 4. The cable 44 provides a interface for transferring data between the CPU 37 of the portable terminal 13 and the CPU 46 forming part of the present apparatus at the secured location 10, although those skilled in the art will understand that other data-transfer techniques can be substituted for the cable. That secured location 10 further includes a memory 47 associated with the CPU in the conventional manner. An output from the CPU 46 is connected via the signal line 48 to selectably drive a solenoid latch 49 when admission to the secured location 10 is granted. The CPU 46 at the secured location 10 optionally provides a signal on the line 21 leading to the silent alarm which, if present as previously mentioned, can indicate an unauthorized access such as entry of the wrong PIN or deliberate entry of a PIN previously chosen to alert others that an emergency exists at the secured location.

Figure 5:
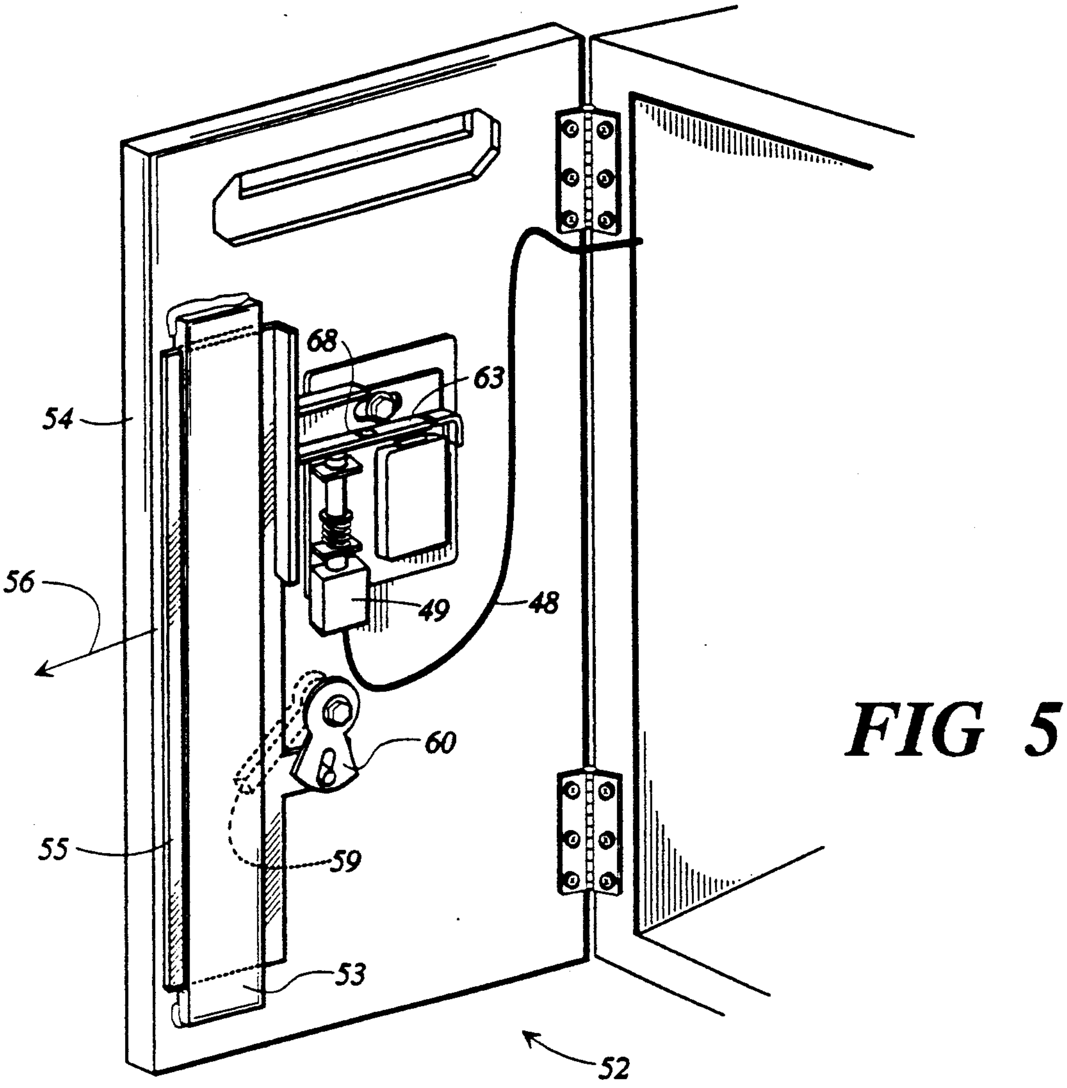
FIG. 5 is a perspective view showing the access latch mechanism according to the preferred embodiment.
Figure 6:
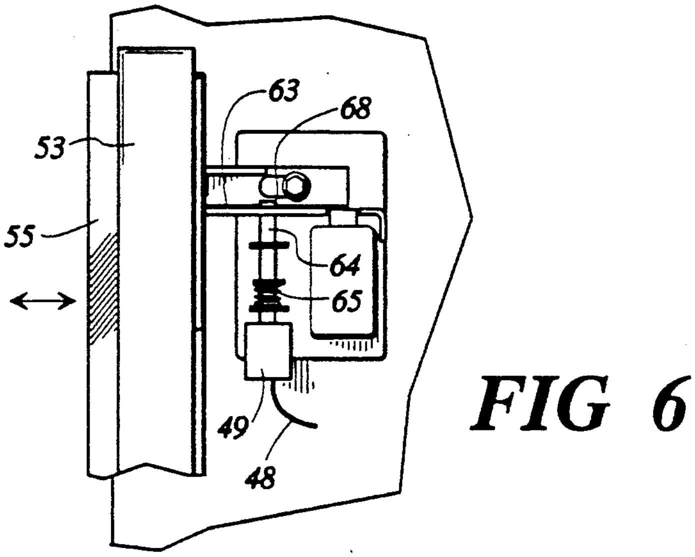
FIG. 6 is a fragmentary elevation view of the latch mechanism shown in FIG. 5.

FIGS. 5 and 6 show the inside of a vault door 52 modified according to the present invention. The vault door 52 is of a kind typically used in ATMs and is shown opened in FIG. 5. This vault door includes a locking bolt 55 in the form of heavy steel plate extending parallel to the open edge 54 of the vault door. The locking bolt 55 slides within the fixed sleeve 53 along one side thereof adjacent the door edge 54. The locking bolt 55 thus is supported to move laterally from its unlocked position shown in FIG. 5, leftward as indicated by the arrow 56 to a locked position in which the locking bolt engages mating structure (not shown) adjacent the open portal of the vault to retain the vault door shut in the portal.

The locking bolt 55 is moved between open and closed positions by rotating the conventional handle 59 located on the front side of the door 52. The handle 59 rotates the lever 60 on the inside of the vault door, imparting lateral movement to the locking bolt 55 through a pin and link connection to the lever. The combination lock and/or key lock conventionally used with the handle 59 are omitted herein for clarity.

A bar 63 is attached at one end to the locking bolt 55 and extends perpendicular to that locking bolt, as best seen in FIG. 6. The bar 63 thus moves with the locking bolt 55 as that bolt is moved laterally by operation of the handle 59. The solenoid latch 49 is mounted on the inside of the door 52 at one side of the bar 63, so that the solenoid armature 64 extends toward the bar. A spring 65 is concentric with the solenoid armature 64 and biases that armature in a direction toward the bar 63.

An opening 68 sized to receive the free end of the solenoid armature 64 extends through the bar 63. This opening 68 is positioned on the bar 63 in relation to the armature 64 so that the opening becomes aligned with the armature only when the locking bolt 55 of the vault door 52 is moved leftwardly, as indicated by the arrow 56 in FIG. 5, to the locked position. In that locked position, the spring 65 forces the solenoid armature 64 upwardly to enter the opening 68 and lock the bar 63 in position as shown in FIG. 6. This engagement of the bar 63 by the bolt 64 thus effectively prevents withdrawing the locking bolt 55 from its locked position by movement of the handle 59, unless the solenoid 49 is energized to withdraw the armature from engagement with the bar 63.

Figure 7:
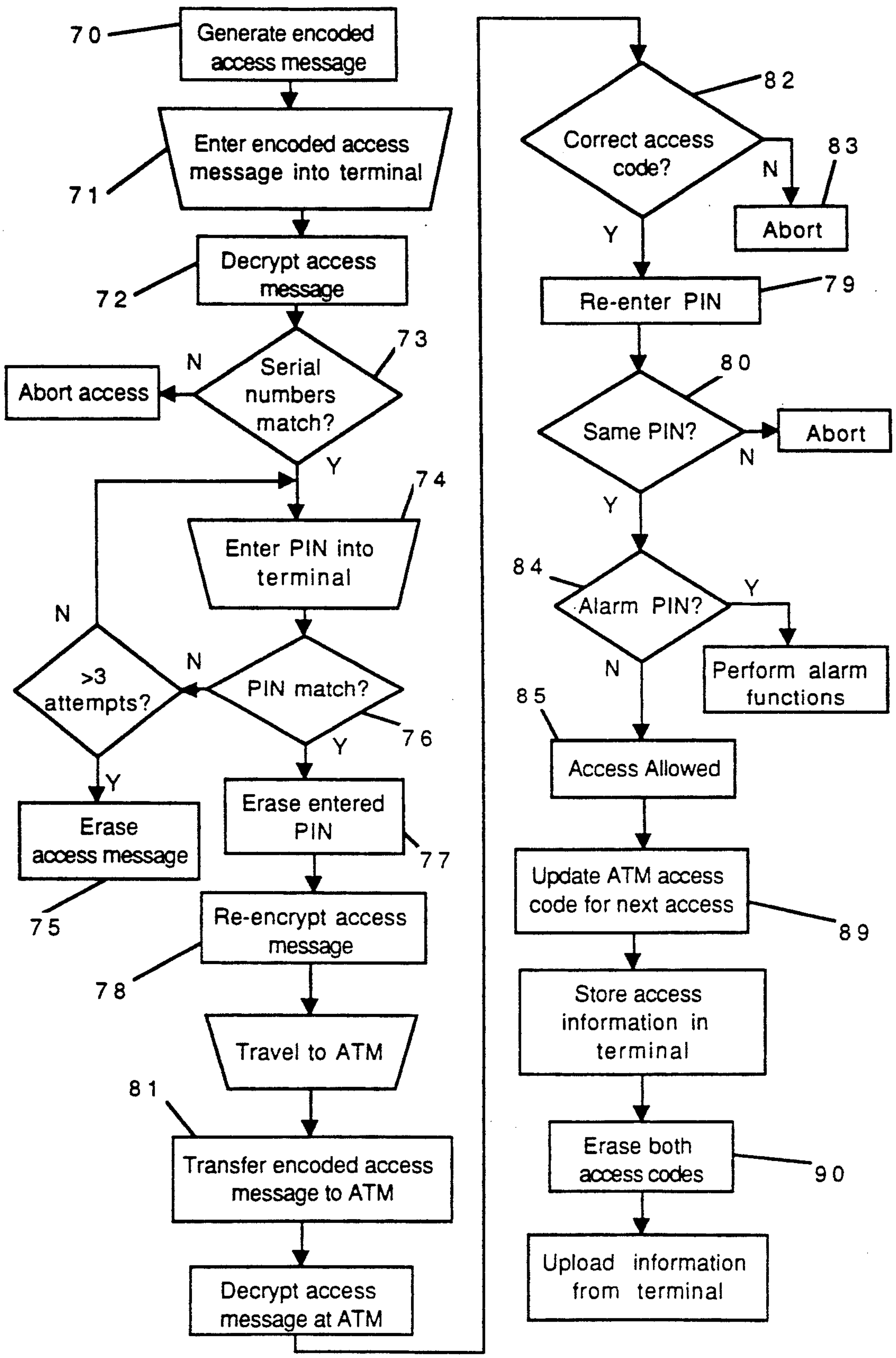
FIG. 7 is a flow chart illustrating operational steps in the method of the first embodiment.

The operation of the preferred embodiment is now described with regard to the flowchart, FIG. 7, representing the functional steps programmed to accomplish the method. The depicted process assumes that access to a particular ATM has been requested. As previously mentioned, this service request commences according to the disclosed embodiment when a dispatcher learns that a particular ATM requires maintenance or service. The dispatcher selects a particular technician for the job, and then enters the identification of the ATM and that technician into the dispatch computer 17 (FIG. 1) which obtains from its database the required information including the PIN of the selected technician, the serial number of the portable terminal assigned to that technician, the present access code previously stored in ATM, and other information as shown in FIG. 2. The computer then encrypts that information, producing a 12-digit encoded access message in the present embodiment as shown at 70 in FIG. 7. The dispatcher then tells the technician the location of the ATM requiring service and announces the 12-digit encoded access message.

Upon receiving this message, the technician manually enters the 12-digit access message into the portable terminal 13 using the keyboard 36 for that purpose, as indicated at step 71 in FIG. 7. The portable terminal 13 decrypts the encoded access message as shown at 72 and then compares the terminal serial number 27 (FIG. 2) contained in the access message with the actual serial number programmed into that terminal, as shown at 73 in FIG. 7. If those serial numbers do not match, the terminal 13 aborts the access attempt at that time and displays an appropriate message for the technician on the display 38 of the portable terminal. This aborted access safeguards against access attempts using a terminal obtained by theft or remaining in the possession of a former technician no longer authorized for access to an ATM.

If the terminal serial number matches in step 73, the terminal then prompts the technician as shown at 40, FIG. 3, to enter his PIN into the terminal. This step is shown at 74 in FIG. 7. The terminal then compares the manually-entered PIN with the technician's authorized PIN 26 (FIG. 2) contained in the encoded access message. If those PINs don't match, the terminal prompts the technician to re-enter the PIN at the keyboard. However, if three repeated attempts to enter the technician's PIN produce no match, the terminal 13 aborts the access attempt and erases the entire encoded access message as shown at 75 in FIG. 7. In this way, anyone who steals or hijacks a technician's portable terminal 13 and then intercepts instructions from the dispatcher, including the 12-digit access message, is thwarted in repeated attempts to guess the proper PIN. Moreover, in that situation the terminal effectively forgets the 12-digit number previously keyed into it, making it impossible to retrieve that number by disassembling the terminal and examining the logic states of the memory or CPU within.

Once the technician enters the correct PIN at step 76, the terminal 13 displays a message acknowledging that entry and then erases the manually-entered PIN from its memory. This erasure of the PIN, shown at 77, provides another level of security, as that PIN cannot be determined by electronic inspection of a terminal hijacked from a technician after entry of the proper PIN. The terminal then re-encrypts the access message using a second encryption algorithm different from the first such algorithm for an added level of security, as shown at step 78 in FIG. 7.

After the technician has entered the proper PIN into the terminal 13 as discussed above, the technician travels to the location of the ATM and connects the terminal 13 to the CPU 46 of the ATM, using the cable 44 for that purpose as illustrated in FIG. 4. The technician then re-enters the PIN as shown at 79 into the portable terminal, which must reconfirm that the proper PIN is presented as shown at 80. This occurs after the re-encrypted access message is transferred to the CPU 46 in the ATM, as shown at 81 in FIG. 7. Where the access message is decrypted by that CPU. At this time, the present access code 28, contained within the access message, is compared at 82 with the present access code previously stored in memory 47 at the ATM. If these access codes don't match, the attempted access is aborted at that point as indicated at 83 in FIG. 7.

If the proper access code, the proper PIN, and the proper ATM are confirmed, the re-entered PIN is compared with an alarm PIN as shown at step 84. If that PIN previously re-entered at step 79 matches the alarm PIN contained within the encoded access message, the system performs certain alarm functions as previously discussed. Otherwise, access to the ATM is allowed as indicated at 85, FIG. 7. The CPU 46 at the ATM accomplishes this access by sending a signal along line 48 to activate the solenoid 49, FIGS. 5 and 6, withdrawing the armature 64 of the solenoid from the opening 68 in the bar 63 connected to the locking bolt 55 of the vault door. The technician can then rotate the handle 59 to withdraw the locking bolt 55 from engagement with its receptacle in the vault, thereby unlocking the door for access to the vault.

After access is allowed at step 85, the present access code previously stored within memory 47 at the ATM is erased as shown at 89 and replaced with the next access code 29 contained in the encoded access message. This next access code remains in memory 47 and in effect becomes a new "present access code" for this particular ATM. After the access code is updated at the ATM, both access codes are erased in the portable terminal as shown at 90. As previously mentioned, the next access code 27 also is stored at the dispatch computer 17. The next time access to this particular ATM is required, the dispatch computer 17 will generate a new encoded access message in which the current "next access code" 29 will become the "present access code" for that new access message. This updating of the access message stored at the ATM or other secured location 10 is a significant aspect of the present invention, because each authorized access to the ATM automatically updates the access code required for the next access to that ATM. No subsequent access to the ATM is possible without that updated access code, which is known only in memory 47 within the particular ATM and at the dispatch computer 17. The CPU 46 associated with the ATM 10 initially includes a default access code which is used (and then replaced) for the initial access to the vault. This default access code may be set by jumper connectors attached to a circuit board and removed when the system is initialized. The CPU 46 and memory 47 preferably have a battery backup power source to prevent memory loss during power outages.

Once access to the ATM is completed, information concerning that access is transferred to the terminal 13 from the CPU 46 associated with the ATM. This access information can include verification that access was allowed, the date and time of such allowance, and the time that the access was terminated, i.e., that the technician closed and relocked the vault door 52. The technician periodically uploads this access information from the portable terminal 13 to the dispatch computer 17, either by directly connecting the portable terminal to the dispatch computer or by dial-in telephone link as appropriate to the particular work patterns of the system. This information allows the dispatcher to maintain a database showing the workload of each technician, including the response time for each service call and the time elapsed while the vault door of each ATM remained open. As mentioned above, the access information also can include the date, time, and disposition of all attempts to access, the PINs and terminal serial numbers employed with those attempts, and other relevant date possibly indicating unauthorized activity at that location.

Modifications to the program access steps shown in FIG. 7 are permissible. For example, after a technician has gained access to the vault, he may find that a particular replacement part or service tool is required from the service vehicle. Security procedure requires that the technician must not leave the open vault unattended, but locking the vault door otherwise will require reinitiating the access authorization procedure shown in FIG. 7. However, once access has been allowed as shown at step 85 in that procedure, the program can be modified to allow the technician to close and relock the vault door but leave the terminal 13 connected to the ATM while obtaining the desired component from the service vehicle. Upon returning to the ATM, the technician merely re-enters the PIN into the terminal 13, whereupon the solenoid latch 49 is again activated to unlock the vault door if the proper PIN was entered.

Figure 8:
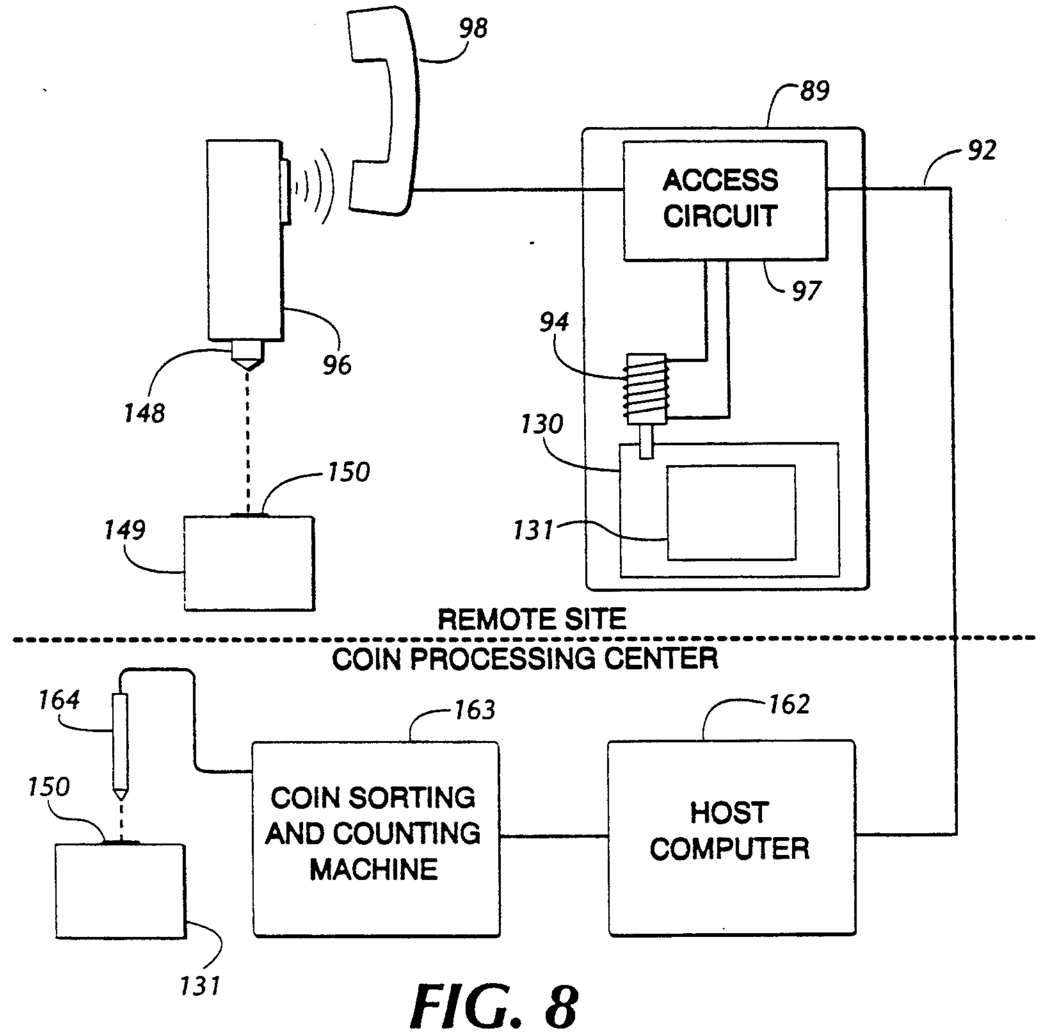
FIG. 8 is a block diagram of apparatus for controlled access to the coin box of a pay telephone according to a second preferred embodiment of the present invention.
Figure 8A:
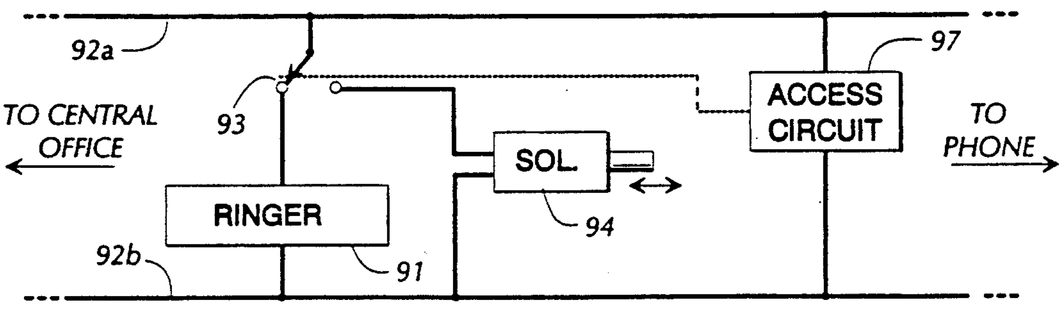
FIG. 8A is a schematic diagram of a pay telephone circuit according to the second embodiment.
Figure 9:
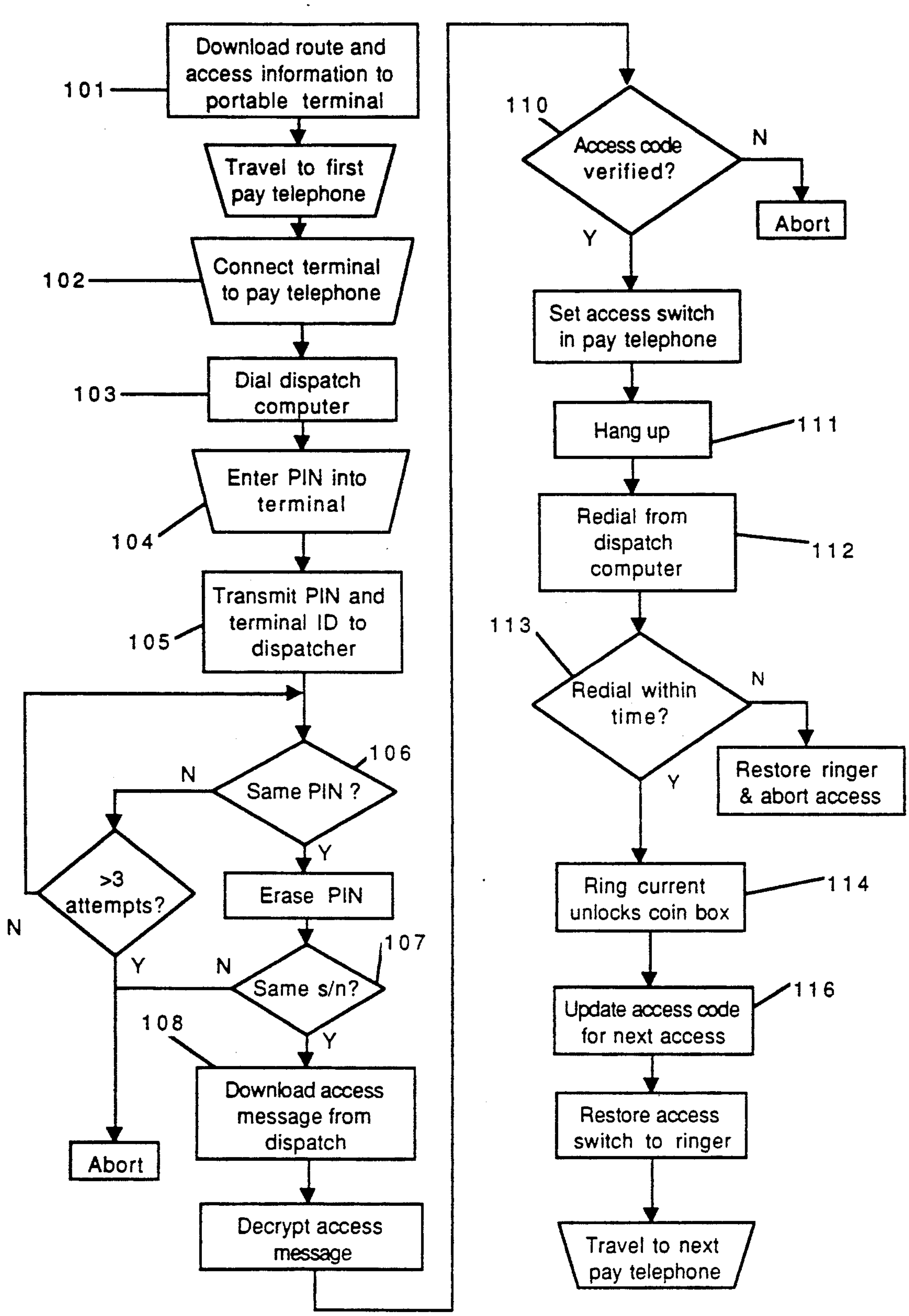
FIG. 9 is a flow chart illustrating operational steps of the second embodiment.

FIGS. 8, 8A, and 9 show an embodiment intended for use in controlling access to the coin boxes of pay telephones. As shown in FIGS. 8 and 8A, a typical pay telephone 89 includes a ringer 91 connected in parallel across the sides 92*a*, 92*b* of the telephone line 92 connecting the pay telephone to the telephone central office in the conventional manner. However, the ringer circuit is modified according to the present invention so that the side of ringer 91 connected to the line 92*a* passes through the switch 93 having a default condition connecting line 92*a* to the ringer, as shown in FIG. 8A. Actuating the switch 93 in response to the access circuit 97, as explained below, removes the line 92*a* from the ringer and instead connects that line to one side of the solenoid lock 94. The other side of the solenoid lock 94 is connected to the line 92*b*. Thus, when the switch 93 is diverted from its default position shown in FIG. 8, ringing current from the central office is received by the solenoid lock 94 instead of the ringer 91.

The switch 93 is under operational control of the access circuit 97 connected across the telephone lines 92*a* and 92*b*, which extend beyond the access circuit for connection with the conventional dialing, speech, and coin-control equipment forming part of the pay telephone. The access circuit 97, which in practice is disposed on a circuit board mounted within the pay telephone, contains a processor programmed to store a predetermined access code, to compare that stored access code with a present access code received over the telephone line 92*a*, 92*b*, and to temporarily set the switch 93 so that ringing current from the telephone central office is temporarily diverted from the ringer 91 to the solenoid 94. The processor within the pay telephone also decrypts the access information received from the portable terminal and the central office, if that information is initially encrypted. With the switch 93 thus set by the access circuit 97, the solenoid lock 94 is activated by ringing current from the central office the next time this particular pay phone is called. The solenoid lock 94 thus unlocks the outer door 130 enclosing the coin box 131 of the phone, enabling the collector to service the coin box without using a key.

The operational program used in connection with the present pay-telephone access system is shown in FIG. 9. It should be understood that a collector servicing pay phones equipped according to the present invention carries a portable terminal 96 equivalent to the terminal 13 described hereinabove. However, portable terminals for pay-phone access preferably include or are modified to include an acoustic coupler for establishing audio communication with the existing handset 98 of the pay telephone. Before the collector sets out on a route to service particular phones on a given day, the telephone numbers of those phones are entered into a dispatch computer along with the PIN assigned to the particular collector, the serial number of the portable terminal carried by that collector, and the particular date for collection from those phones. That information is downloaded to the portable terminal as shown at step 101 in FIG. 9, and the collector then travels to the first phone for that day.

As the collector visits each pay phone chosen for collection on a particular day, the collector connects the handset of that phone to the portable terminal 96 as shown at 102 in FIG. 9, and then dials the telephone number for connection to the dispatch computer as shown at 103. It will be evident that the telephone number of the dispatch computer advantageously is programmed into the collector's portable terminal, which can outpulse DTMF signals acoustically coupled to the telephone handset of the pay phone.

Once telephone communication is established between the particular pay phone and the dispatch computer, the collector enters the assigned PIN into the portable terminal as shown at 104. That PIN and the terminal serial number or identification internally programmed within the terminal are transmitted to the dispatch computer as shown at 105. That number is transmitted to the dispatcher. The serial number of the portable terminal and the PIN of the collector are compared with information in the dispatch database for verification on that particular date, as shown at 106 and 107, and the attempted access to the coin box of the pay phone is aborted if verification of that information is not forthcoming.

Once the collector's PIN and the terminal identification are verified, the dispatch computer transmits a coded access message over the telephone line connected to the pay phone, as shown at 108. This message is received by the access circuit 97, FIG. 8, and takes the form of DTMF audio pulses for telephone systems presently existing.

The access circuit 97 within the pay phone comprises a central processing unit (CPU) and memory similar to the CPU 46 and memory 47 associated with the ATM 10 in the embodiment previously described. This access circuit is programmed to decrypt the access message, if that message was originally transmitted in encrypted form, and compare the "present access code" of that message with the corresponding code previously stored within the access circuit. This step is shown at 110 in FIG. 9. If the access circuit 97 verifies receipt of the proper access code, that circuit sets the switch 93 from its default position shown in FIG. 8A, to the position connecting the solenoid latch 94 to both sides of the telephone line 92*a*, 92*b*. At this time, the dispatch computer hangs up as shown at 111 in FIG. 9, breaking the telephone connection to the pay telephone.

The dispatch computer next immediately redials that pay phone as shown at 112. In response to this redialing, the telephone company central office sends ringing current on the lines 92*a* and 92*b* and this ringing current now passes through the solenoid latch 94 instead of the ringer 91. If the callback fails to occur in a predetermined time after hangup 111, the attempted access aborts as shown at 113 and the switch 93 restores the ringer 91 to default mode connected across the telephone lines. The ringing current thus operates the solenoid latch to unlock the door 130 to the coin box, as shown at 111 allowing the collector to remove the full coin box 131 and replace it with an empty one in accordance with established practice. The access circuit 97 at this time erases the "present access code" previously stored therein, and receives and stores a "next access code" contained in the access message previously received from the dispatch computer, as shown at 116. The access circuit 97 also restores the switch 93 to its default state, reconnecting the ringer 91 across the telephone lines 92*a*, 92*b* to receive ring current the next time this pay phone receives a call.

The pay phone access system described herein allows a collector to access the coin boxes of pay phones without carrying any individual keys or master key for the telephones, relying only on the portable terminal and information previously stored at the dispatch computer. However, coin-box access with the present system is possible only if the present access code stored in the access circuit of the telephone matches the present access code received from the dispatch computer, making it virtually impossible for an enterprising thief to program a personal computer to emulate the functions of the portable terminal carried by the collector. Moreover, telephone access is obtained only after active participation from the dispatch computer, namely, redialing the pay phone within a short time after authorization and initial hang up.

Figure 10:
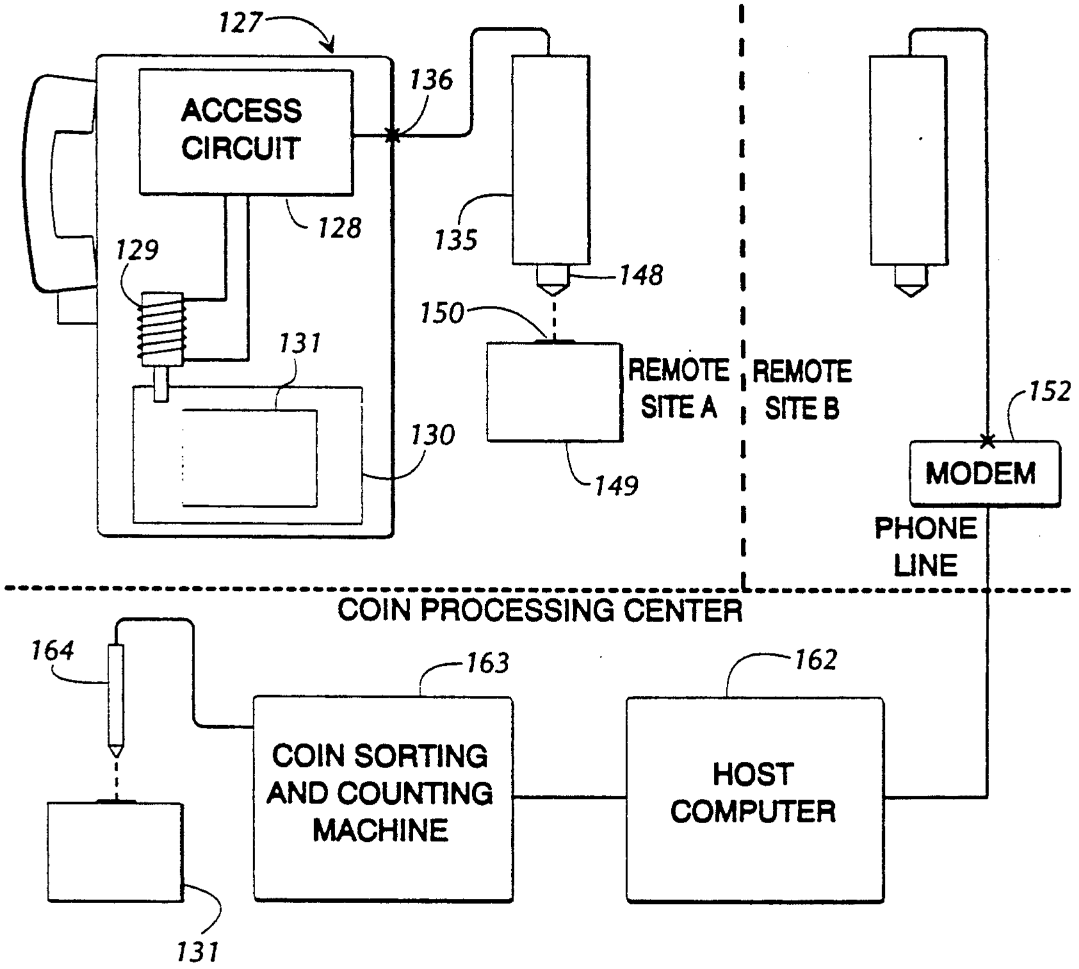
FIG. 10 is a block diagram of a pay telephone coin box access apparatus according to a third preferred embodiment of the invention.
Figure 11:
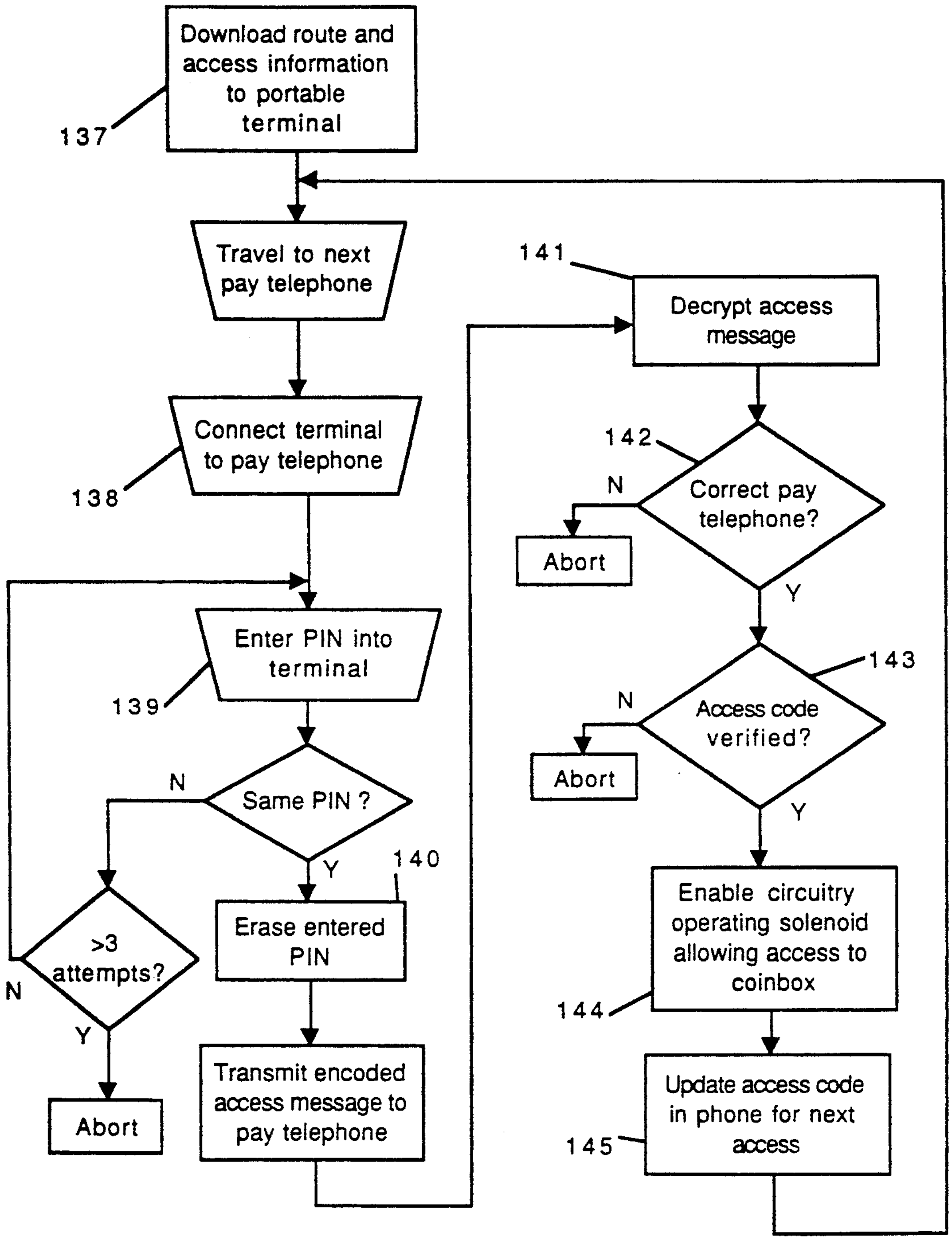
FIG. 11 is a flow chart illustrating operational steps of the third embodiment.

FIGS. 10 and 11 show an alternative embodiment for controlled access to the coin boxes of pay telephones. Moreover, and unlike the pay-telephone embodiment described with reference to FIGS. 8, 8A, and 9, this alternative embodiment can access the coin box of a pay telephone when the telephone line is inoperative or not connected to the pay telephone. The embodiment shown in FIG. 10 does not require the pay phone to originate or receive any calls, and does not add to the traffic load on the telephone system during peak-load daytime hours when pay phone collections usually take place.

Turning first to FIG. 10, the pay telephone 127 is modified to contain an access circuit 128 connected to drive a solenoid lock 129 which, when energized, unlocks the door 130 and allows access to the removable coin box 131 contained within the pay telephone. Unlike the access circuit 97 in the embodiment of FIG. 8, the access circuit 128 does not operate a switch to divert ringing current to the solenoid lock. However, the access circuit 128 performs many security functions similar to those of the preceding embodiments, as is described below, and that access circuit selectively furnishes the solenoid 129 with operating power obtained from the portable terminal 135 temporarily connected to the pay telephone 127 by a collector. The conventional pay phone 127 thus requires modification to add the access circuit 128, the solenoid lock 129, and a port 136 for establishing data and power transfer between the access circuit 128 and the portable terminal 135. The electrical power required to drive the solenoid lock 129 preferably is obtained from the battery pack associated with the terminal 135; the power required for momentary actuation of the solenoid lock required to unlock the door 130 is well within the capacity of battery packs used on conventional portable terminals, and that momentary power requirement does not significantly reduce the useful lifetime of the battery pack between charges.

Operation of the embodiment as thus far described with respect to FIG. 10 is now described with reference to FIG. 11. As with the portable terminal 96 used for pay-telephone access in the embodiment of FIG. 9, the portable terminal 135 receives information from a dispatch computer or host computer concerning the telephone numbers and locations of pay telephones scheduled for collection on a given day. The identification number of the authorized portable terminal, the present access code and a future access code for each of those pay telephones, along with the PIN assigned to the particular collector, also are included in the information downloaded to the portable terminal 135. This information can be downloaded to the portable terminal by modem and telephone link to the host computer, as appearing at step 137 in FIG. 11.

The collector then travels to a pay telephone set for collection on the particular day and, as shown at 138 in FIG. 11, connects the portable terminal 135 to the port 136 installed at that pay telephone. The collector next enters the known PIN into the terminal 135 as shown at 139 in FIG. 11, where the terminal must confirm that PIN with the encrypted information previously downloaded to the terminal before proceeding further along the access steps.

If the portable terminal 135 confirms the identity of the PIN entered by the collector, the terminal erases that manually-entered PIN as shown at 140 and then transfers to the pay telephone the encoded access message previously downloaded for that particular telephone. That access message is decrypted by a decryption algorithm stored within the access circuit 128, as shown at step 140 in FIG. 11. The decrypted access message includes the telephone number of that particular pay telephone, and that information is compared with the actual number assigned to that telephone and stored in the access circuit 128 to verify that the portable terminal is connected to the correct telephone. This verification is shown at 141 in FIG. 11. If the correct telephone is indicated, the access circuit 128 compares the present access code decrypted from the access message with the present access code previously stored within the access circuit of that telephone. If these access codes match as shown at 142, the access circuit 128 closes a connection between the portable terminal 135 and the solenoid lock 129, actuating that lock to unlock the door 135. The collector now opens the door and gains access to the removable coin box 131 within the pay telephone.

With access thus authorized at the particular pay telephone, the access circuit replaces the present access code in the access circuit 128 with a new access code contained in the access message downloaded from the terminal, and sends to the portable terminal 135 selected information about the particular access. This information can include the date and time access was granted, that information being associated within the portable terminal 135 with the phone number of the particular pay telephone being serviced and the PIN identifying the collector. This access information is later uploaded from the portable terminal 135 to the host computer at the dispatch location or elsewhere, as shown at 144 in FIG. 11. The collector, after removing the full coin box and replacing it with an empty receptacle, then disconnects the portable terminal 135 from the pay telephone and travels to another pay telephone scheduled for service on that date.

It will thus be seen that the pay-telephone access system described with regard to FIGS. 10 and 11 permits selective and controlled access to the telephone coin box without placing or receiving any telephone message at the pay telephone, and without requiring power from an incoming call or otherwise from the telephone company central office to actuate the unlocking mechanism within the telephone. The present embodiment of controlled-access system thus does not add to the traffic load on the telephone switching system, and increases the speed of access by eliminating the time required for placing the initial call and then awaiting the call-back associated with the embodiment of FIGS. 8 and 9.

Referring once again to FIGS. 8 and 10, it is seen that each of the portable terminals 96 and 135 is optionally equipped with a bar code scanner 148 which operates to read a bar code label 150 on the empty coin box 149 as well as a similar label on the full coin box 131 within the pay telephone. Such portable terminals including a bar code scanner are known in the art and are commercially available, one example being the Denso Model BHT-2061 terminal made by NippsonDenso Company. When used with the embodiment shown in FIG. 10, this terminal is equipped with a serial port for connection to the port 136 on the pay telephone. The serial port permits data transfer with the access circuit within the pay telephone and supplies operating power to the solenoid lock.

The bar code label on each coin box contains, in scanner-readable bar code format, the information printed or written onto the collection stubs presently associated with coin boxes and manually filled in by the collectors. As known to those skilled in the art, this information includes an identification number of the individual receptacle, the telephone number of the pay phone for which the receptacle is intended, the route and stop numbers at which that telephone is located, the number of the full receptacle which a particular empty receptacle replaces, the time and date of collection, the identification of the collector, and other information as required by the pay-telephone operator. The manual collection stubs presently in use also contain blocks manually checked by the collector when the coin box is overflowing or when larceny is indicated by the condition of the telephone.

At the present time, some of the foregoing information is preprinted on the collection stubs and attached to each empty coin box, and the remaining information is manually entered by the collector when each full coin box is removed from a pay telephone. Those manual stubs are returned to the coin processing center along with the full coin boxes, where the manually-entered information must then be keyed into a computer for correlation with the coin boxes and the count of money contained in each box. By containing all the foregoing information on a bar code label affixed to each coin box, the collection process is significantly speeded and errors in manual entry of date and time information by the collector are eliminated.

Figure 11A:
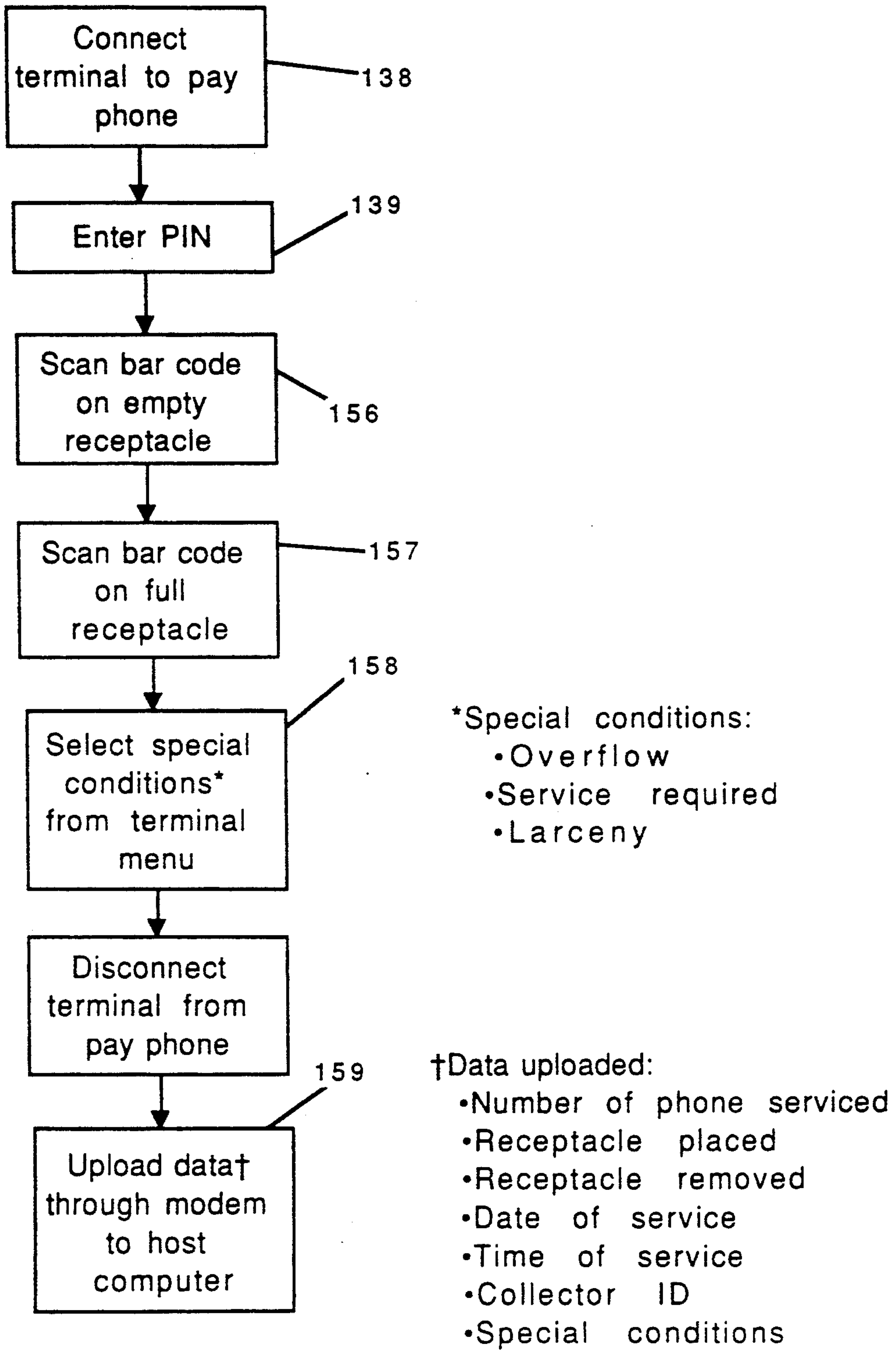
FIG. 11A is a flow chart illustrating operational steps of the bar-code scanning option disclosed with regard to the second and third embodiments.

FIG. 11A illustrates operational steps associated with the bar-code identification of the coin boxes using the scanner 148 associated with the portable terminal 96 shown in FIG. 8 and the portable terminal 135 shown in FIG. 10. It should be understood that the scanner 148 and associated scanning functions outlined in FIG. 11A are optional to the secured access system previously described with reference to FIGS. 10 and 11. Likewise, the operational steps shown in FIG. 11A and associated with the bar code labeling system are in addition to the operational steps shown in FIG. 11 for obtaining access to the coin box within a particular pay telephone.

Referring now to FIG. 11A, the portable terminal is connected to or otherwise in data communication with a pay telephone and the PIN of the collector is entered as shown at 138 and 139, those steps previously described with respect to FIGS. 9 and 11. The collector then selects an empty coin box 149 intended for the particular pay telephone and scans the label 150 on that coin box, using the scanner 148 associated with the portable terminal. This scanning step appears at 156 in FIG. 11A and can take place after access is granted to the particular pay telephone, so that the particular telephone number is associated in the memory of the portable terminal with the identification number obtained by scanning the label on the empty coin box 149. The collector next uses the scanner 148 to scan the bar code label on the full coin box 131 being removed from the pay telephone, as shown at 157 in FIG. 11A. The collector then places the empty coin box 149 in the receptacle of the pay telephone and closes the door 130 of the pay telephone, and if necessary selects certain preprogrammed special conditions from the appropriate menu on the portable terminal. These special conditions, as indicated at step 158 in FIG. 11A, include overflow of the coin box, indication of larceny, or other service needs indicated by the collector's visual inspection of the pay telephone. This indication of special conditions at 158 in FIG. 11A thus corresponds in function to the check boxes on the stubs now in use and manually filled in by the collectors.

After entering any special conditions into the portable terminal, the collector disconnects that terminal from the pay telephone and travels to the next telephone scheduled for collection. The portable terminal stores the coin box and telephone data obtained from each collection, and periodically uploads that data through a modem 152 and dial-up telephone connection to a host computer 162 as indicated at 159 in FIG. 11A. This host computer advantageously is connected to coin sorting and counting equipment 163 located at the coin processing center where the various full coin boxes 131 removed from pay telephones are brought for emptying and counting. This coin sorting and counting equipment 163 is known to those skilled in the art, and preferably is equipped with a bar code scanner 164 for reading the bar code label on each coin box 131 as the contents of that coin box are emptied into the sorting and counting equipment. The coin count from each coin box thus becomes associated with that coin box and with the pay telephone from which that coin box was removed, as shown from information previously uploaded to the host computer 162 from the portable terminal, without manual entry of data by the collector in the field or by others at the coin processing center.

It should also be understood that the foregoing relates only to a preferred embodiment of the present invention, and that numerous changes and modifications therein may be made without departing from the spirit and scope of the invention as defined in the following claims.

What is claimed is:

1. A method for allowing access to a secured location, comprising the steps of:

generating a signal containing encoded information identifying an access code only for a particular secured location and an identification number for a particular person authorized to access that location;

the access code in the encoded information being a present access code;

the encoded information also containing a new access code for the next authorized access to the secured location;

entering that encoded information into a portable terminal carried by the person seeking access to the secured location;

transferring the portable terminal with the entered encoded information to the secured location;

comparing the present access code in the encoded information with an access code previously stored at the secured location to verify that the access code in the encoded information is the same as the access code at the secured location;

comparing the identification number in the encoded information with a current identification number of the person seeking access to the secured location to verify that the current identification number is the same as the identification number in the encoded information; and then granting access to the secured location only if the verifications are true; and then in response to granting access, replacing the access code previously stored at the secured location with the new access code contained in the encoded information, so that the new access code becomes stored at the secured location for comparison with a subsequent present access code the next time access to the particular secured location is sought.

2. A method for allowing a particular person access to a selected one of plural automated teller machines (ATMs) by means of a portable terminal, comprising the steps of:

generating an encoded access message containing information identifying an access code previously stored at the selected ATM, and a personal identification number (PIN) for the particular person;

entering the encoded message in the portable terminal apart from the ATM;

entering the PIN in unencoded form in the portable terminal;

comparing the entered PIN with the PIN contained in the encoded message previously entered into the portable terminal to authorize an access only if the PINs bear a predetermined relation to each other; and then establishing data communication between the portable terminal and an ATM, and transferring the access message in encoded form from the portable terminal to the ATM;

comparing the access code contained in the encoded message with the access code previously stored at the ATM to verify that the access code in the encoded message is the same as the access code at the selected ATM;

re-entering the PIN in unencoded form into the portable terminal;

comparing the re-entered PIN with the PIN contained in the encoded message communicated to the ATM from the terminal; and granting access to the ATM only if the same access codes are present and the re-entered PIN bears a predetermined relation to the PIN in the encoded message communicated to the ATM.

3. The method as in claim 2, wherein:

the portable terminal erases the PIN previously entered in unencoded form, in response to the first step of comparing that PIN with the PIN in the encoded access message, so that the unencoded PIN cannot be determined thereafter by access to information entered in the portable terminal.

4. The method as in claim 2, wherein:

the access code in the encoded access message is a present access code, and the encoded message also contains a future access code for the next authorized access to the ATM, and substituting the future access code for the access code previously stored at the selected ATM in response to granting access to the ATM, so that the future access code remains at the selected ATM for comparison with a present access code in another encoded message the next time access to the ATM is sought.

5. The method as in claim 4, comprising the further step of erasing both access codes from the portable terminal once the future access code is substituted for the access code previously stored at the selected ATM.

6. A method for allowing a particular person to access a secured location, comprising the steps of:

generating information including a unique original access code previously stored at the secured location, a new access code for the secured location, and an identification number for the particular person;

encrypting the encoded information;

transferring the encrypted information to the secured location;

decrypting the encrypted information;

comparing the original access code in the decrypted information with the access code previously stored at the secured location to verify that a predetermined relation exists therebetween;

allowing access to the secured location only if the verification is true; and replacing the access code stored at the secured location with the new access code in the decrypted information, in response to allowing access, so that the new access code is stored at the secured location for comparison when attempting the next access.

7. Apparatus for obtaining selective access to a cash-receiving device having a receptacle for receiving a removable cash box and a closure for preventing unauthorized access to the receptacle, comprising:

means associated with the device to receive and store an access code required for the next access to the device;

a portable terminal separate from the device for receiving an access message containing in encoded form an access code and a personal identification number (PIN) for a certain person authorized to access the device;

means associated with the portable terminal for entering an unencoded PIN;

means associated with the portable terminal for producing a certain logic state when the entered PIN has a predetermined relation to the PIN encoded in the access message;

data transfer means selectively operative to transfer the encoded access message to the device only in response to the certain logic state;

means associated with the device for comparing the access code in the access message with an access code stored at the device and providing an authorization signal allowing access to the receptacle only in response to a predetermined relation between the access codes;

an encoded label associated with each cash box to identify that cash box; and a scanner associated with the portable terminal to scan the label on each cash box removed from a device and on each empty cash box installed in the device, whereby signals identifying the removed and installed cash boxes are stored in the portable terminal.

8. Apparatus as in claim 7, wherein:

the cash receiving device is a pay telephone having a receptacle for receiving a movable coin box and a door for preventing unauthorized access to the receptacle, and further comprising:

a latch associated with the door and operative only in response to the authorization signal to release the door for access to the receptacle.

9. Apparatus as in claim 8, wherein:

the latch comprises a solenoid selectively operative to release the door, and further comprising means selectively operative in response to the authorization signal to supply operating current to the solenoid from the terminal, whereby the solenoid releases the door.

10. A method for allowing access to a secured location, comprising the steps of:

generating a signal containing encoded access information identifying an access code for a particular secured location and an identification number for a particular person authorized to access that location;

transferring the encoded information to the secured location by entering that encoded information into a portable terminal carried by the person seeking access to the secured location;

entering the current identification number into the terminal;

comparing the identification number in the encoded information with the identification number entered into the terminal;

erasing the encoded access information from the terminal if a predetermined relation between the identification numbers is not presented by the comparison;

comparing the access code in the encoded information with an access code previously stored at the secured location to verify that the access code in the encoded information is the same as the access code at the secured location;

comparing the identification number in the encoded information with a current identification number of the person seeking access to the secured location to verify that the current identification number is the same as the identification number in the encoded information; and then granting access to the secured location only if the verification are true.

11. The method as in claim 10, comprising the further steps of:

transferring the access information in encoded form from the terminal to the secured location, if and only if the predetermined relation between identification numbers is present; and thereafter performing the step of comparing access codes.

12. The method as in claim 10, comprising the further steps of:

decoding the signal containing encoded access information after transferring that signal to the secured location;

performing the step of comparing the identification numbers; and then re-encoding the access information within the terminal if and only if the predetermined relation between identification numbers is present; and thereafter transferring the re-encoded access information to the secured location.

13. The method as in claim 10, wherein:

the portable terminal contains a unique serial number distinguishing that terminal from other terminals;

the encoded information includes the serial number of a particular terminal authorized for the next access to the secured location; and comparing the serial number in the encoded information with the serial number within the terminal to determine whether the serial numbers match; and aborting the access attempt if the terminal identification numbers do not match.

14. Apparatus for obtaining selective access to a secured location, comprising:

means associated with the secured location to receive and store an access code required for the next access to the secured location;

terminal means separate from the secured location for receiving an access message containing in encoded form an access code and a personal identification number (PIN) for a certain person authorized to access the location;

means associated with the terminal means for entering an unencoded PIN;

means associated with the terminal means for producing a certain logic state when the entered PIN has a predetermined relation to the PIN encoded in the access message;

data transfer means selectively operative to transfer the encoded access message to the secured location only in response to the certain logic state;

means associated with the secured location for comparing the access code in the access message with an access code stored at the secured location and providing an authorization signal allowing access to the secured location only in response to a predetermined relation between the access codes; and the terminal means is operative in response to the certain logic state to erase the unencoded PIN previously entered in the terminal means, whereby the terminal means cannot transfer the unencoded PIN to the secured location.

15. Apparatus for obtaining selective access to a secured location, comprising:

means associated with the secured location to receive and store an access code required for the next access to the remote location;

terminal means separate from the secured location for receiving an access message containing in encoded from an access code and a personal identification number (PIN) for a certain person authorized to access the location;

means associated with the terminal means for entering an unencoded PIN;

means associated with terminal means for producing a certain logic state when the entered PIN has a predetermined relation to the PIN encoded in the access message;

data transfer means selectively operative to transfer the encoded access message to the secured location only in response to the certain logic state;

means associated with the secured location for comparing the access code in the access message with an access code stored at the secured location and providing an authorization signal allowing access to the secured location only in response to a predetermined relation between the access codes; and the secured location includes means responsive to re-entry of an unencoded PIN at the entry means of the terminal to compare the re-entered PIN with the PIN in the encoded access message transferred to the secured location and to provide the access authorization signal only in response to a predetermined relation between the PINs in addition to the predetermined relation between access codes.

16. Apparatus for obtaining selective access to a pay telephone having a receptacle for receiving a removable coin box and a door for preventing unauthorized access to the receptacle, comprising:

means associated with the telephone to receive and store an access code required for the next access to the telephone;

terminal means separate from the telephone for receiving an access message containing in encoded form an access code and a personal identification number (PIN) for a certain person authorized to access the telephone;

means associated with the terminal means for entering an unencoded PIN;

means associated with the terminal means for producing a certain logic state when the entered PIN has a predetermined relation to the PIN encoded in the access message;

data transfer means selectively operative to transfer the encoded access message to the secured location only in response to the certain logic state;

means associated with the secured location for comparing the access code in the access message with an access code stored at the secured location and providing an authorization signal allowing access to the secured location only in response to a predetermined relation between the access codes;

a solenoid latch associated with the door and operative only in response to the authorization signal to release the door for access to the receptacle; and a circuit connected to a telephone line for the telephone and operative in response to the authorization signal to temporarily supply the solenoid ringing current on the telephone line, whereby the solenoid operates to unlatch the door in response to ringing current on the telephone line during the temporary connection.

17. A method for allowing a particular person access to a selected one of plural secured devices by means of a terminal, comprising the steps of:

generating an encoded access message containing information identifying an access code previously stored at the selected secured device, and a personal identification number (PIN) for the particular person;

entering the PIN in unencoded form in the terminal;

entering the encoded message in the terminal apart from the secured device;

comparing the entered PIN with the PIN contained in the encoded message previously entered into the terminal to authorize an access only if the PINs bear a predetermined relation to each other, and then establishing data communication between the terminal and a particular secured device, and transferring the access message in encoded form from the terminal to the secured device;

comparing the access code contained in the encoded message with the access code previously stored at the secured device to verify that the particular secured device is the selected secured device;

re-entering the PIN in unencoded form into the terminal;

comparing the re-entered PIN with the PIN contained in the encoded message communicated to the secured device from the terminal; and granting access to the selected secured device only if the comparison of access codes verified that the particular secured device is the selected secured device and the re-entered PIN bears a predetermined relation to the PIN in the encoded message communicated to the secured device.

18. A method for allowing a particular person access to a selected one of plural secured devices by means of a terminal, comprising the steps of:

generating an encoded access message remote from the secured device, the access message containing information identifying an access code previously stored at the selected secured device and a personal identification number (PIN) for the particular person;

transferring the encoded message to the selected secured device;

decoding the encoded message to obtain the access code and PIN in unencoded form;

supplying the PIN of the person in unencoded form to the selected secured device;

comparing the supplied PIN with the PIN obtained by decoding the encoded message transferred to the selected secured device to authorize an access only if the PINs bear a predetermined relation to each other; and then comparing the access code obtained by decoding the encoded message transferred to the secured device with the access code previously stored at the secured device to verify the identity of the selected secured device;

granting access to the selected secured device only if the comparison of access codes verifies that the particular secured device is the selected secured device and the supplied PIN bears a predetermined relation to the PIN in the encoded message communicated to the secured device; and erasing the access message if the predetermined relation is not presented by the comparison.

19. A method for allowing a person to access a secured location, comprising the steps of:

generating an encrypted message containing information identifying an access code for a particular secured location and an identification number for a particular person authorized to access that location;

entering the encrypted message into a portable terminal carried by the person seeking access to the secured location;

entering into the terminal an identification number for that person;

decrypting the message within the portable terminal to obtain the identification number;

comparing the identification number in the message with the identification number entered into the portable terminal;

if a predetermined relation between the identification numbers is presented by the comparison, establishing data communication between the portable terminal and the secured location; and then decrypting the message to obtain the access code;

comparing the access code in the decrypted message with an access code previously stored at the secured location to verify that the access code in the message is the same as the access code at the secured location; and granting access to the secured location only if the verification is true.

20. The method as in claim 19, comprising the further step of:

erasing the encrypted access message from the terminal if the predetermined relation between identification numbers is not presented by the comparison.

21. The method as in claim 19, wherein;

after the second-mentioned step of decrypting the access code, re-entering the identification number and again comparing that identification number with the decrypted identification number; and terminating the attempted access if a predetermined relation is not present between the identification numbers.

22. The method as in claim 19, wherein:

the access code in the encrypted message is a present access code;

the encrypted message also contains a new access code for the next authorized access to the secured location;

the step of comparing access codes comprises comparing the present access code decrypted from the encrypted message with an access code previously stored at the secured location; and then in response to granting access, replacing the access code previously stored at the secured location with the new access code decrypted from the encrypted message, so that the new access code becomes stored at the secured location for comparison with a subsequent present access code the next time access to the particular secured location is sought.

23. A method for allowing a person to access a secured device, comprising the steps of:

generating a message containing information identifying an access code for a particular secured device, a terminal number for a certain terminal, and an identification number for a particular person authorized to access that device;

entering the message into a terminal operatively associated with a terminal number;

entering into the terminal an identification number for that person;

comparing the identification number in the message with the identification number entered into the terminal;

comparing the terminal number in the message with the terminal number associated with the terminal;

if predetermined relations occur between the identification numbers and between the terminal numbers in response to the comparisons, establishing data communication between the terminal and the secured device, otherwise terminating the attempted access;

once the data communication is established, comparing the access code in the message with an access code previously stored at the secured device to verify that the access code in the message is the same as the access code at the secured device; and granting access to the secured device only if the access code verification is true.

24. The method as in claim 23, wherein:

The message is generated in encrypted form and is entered into the terminal in that form; and comprising the further step of decrypting the message within the portable terminal to obtain the identification number and the terminal number for the comparisons.

* * * * *